(12) United States Patent
Beck et al.

(10) Patent No.: US 6,814,920 B2
(45) Date of Patent: Nov. 9, 2004

(54) METHOD FOR FORMING A NON-DELAMINATING MULTILAYER CONTAINER MOUTH

(75) Inventors: Martin H. Beck, Amherst, NH (US); George F. Rollend, Amherst, NH (US)

(73) Assignee: DTL Technology Limited Partnership, Amherst, NH (US)

(*) Notice: Subject to any disclaimer, the term of this patent is extended or adjusted under 35 U.S.C. 154(b) by 346 days.

(21) Appl. No.: 10/022,109

(22) Filed: Dec. 13, 2001

(65) Prior Publication Data

US 2003/0113491 A1 Jun. 19, 2003

(51) Int. Cl.[7] .................. B29C 49/22; B29C 49/02; B29C 49/74; B29C 53/34; B29C 57/12

(52) U.S. Cl. .................. 264/512; 264/513; 264/514; 264/515; 264/519; 264/521; 264/534; 264/536; 264/907; 264/908; 264/296; 264/322; 264/327; 264/162; 156/226; 156/227; 156/258

(58) Field of Search .................. 264/296, 322, 264/327, 519, 521, 162, 512, 513, 514, 515, 536, 534, 907, 908; 156/226, 227, 258

(56) References Cited

U.S. PATENT DOCUMENTS

| | | | | |
|---|---|---|---|---|
| 2,859,575 A | * | 11/1958 | Lehmann ..................... | 53/341 |
| 3,355,536 A | * | 11/1967 | Midgley et al. ............. | 264/322 |
| 3,739,052 A | * | 6/1973 | Ayres et al. ................ | 264/512 |
| 3,977,153 A | * | 8/1976 | Schrenk ...................... | 53/453 |
| 4,281,979 A | * | 8/1981 | Doherty et al. ............. | 425/391 |
| 4,391,863 A | * | 7/1983 | Bonis ......................... | 206/524.6 |
| 4,554,190 A | * | 11/1985 | McHenry et al. ........... | 220/62.21 |
| 4,824,504 A | * | 4/1989 | Kagata ....................... | 156/216 |
| 4,856,667 A | * | 8/1989 | Thompson .................. | 215/318 |
| 4,982,872 A | * | 1/1991 | Avery ........................ | 220/62.13 |
| 5,049,019 A | * | 9/1991 | Franek et al. .............. | 413/19 |
| 5,181,615 A | * | 1/1993 | Thompson .................. | 220/618 |
| 5,246,753 A | * | 9/1993 | Koyama et al. ............ | 428/36.7 |
| 5,431,619 A | * | 7/1995 | Bacon et al. ............... | 493/158 |
| 5,523,042 A | * | 6/1996 | Clements .................... | 264/296 |
| 5,674,448 A | * | 10/1997 | Slat et al. ................... | 264/513 |
| 5,736,093 A | * | 4/1998 | Slat ............................ | 264/513 |
| 6,062,408 A | | 5/2000 | Beck et al. ................. | 215/379 |
| 6,126,886 A | * | 10/2000 | Beck et al. ................. | 264/521 |
| 6,237,791 B1 | * | 5/2001 | Beck et al. ................. | 215/379 |
| 6,296,803 B1 | * | 10/2001 | Darr ........................... | 264/513 |
| 6,740,284 B2 | * | 5/2004 | Darr et al. .................. | 264/521 |

FOREIGN PATENT DOCUMENTS

JP 02-085177 A * 3/1990 ........... B65D/77/30

OTHER PUBLICATIONS

JPO Abstract of JP–02–085177–A, Jan. 2004, JPO website.*

* cited by examiner

Primary Examiner—Michael P. Colaianni
Assistant Examiner—Michael I. Poe
(74) Attorney, Agent, or Firm—Davis & Bujold, P.L.L.C.

(57) ABSTRACT

A method of preventing delamination of multiple layers of an oriented polymer container having an opening defined by the multiple layers comprising a bi-axially oriented multilayer polymer container having an opening defined by a perimeter at which the multiple layers are exposed; heating the perimeter until workable; providing a curling die; feeding the multilayer perimeter into the curling die to curl the perimeter sufficiently to inhibit delamination of the layers and a container when so made.

20 Claims, 2 Drawing Sheets

METHOD FOR FORMING A NON-DELAMINATING MULTILAYER CONTAINER MOUTH

This invention relates to method of making a wide mouth, non-delaminating, multilayer, plastic container and the product of the method. This may be accomplished by making a multilayer preform, blowing it into a bottle, trimming off a portion of the top and curling the trimmed end. In this case, multilayer is defined as a container made from a preform that is either co-injected, sequentially molded, overmolded or other methods known in the industry. An alternative form of the invention involves the nesting of at least two plastic containers defining an open mouth and curling the material adjacent the open mouth to prevent separation of the containers at the mouth.

As used herein "curl" shall be construed to include shapes other than a circular or part circular shapes, for example, oval shapes, folded shapes, flattened rolls or combinations of these.

BACKGROUND OF THE INVENTION

Suitable materials are those that can be bi-axially oriented for packaging bottles i.e. orientable polymers, preferably heat settable such as, but not limited to, polyesters such as polyethylene terephthalate (PET), polypropylene (PP) and acrylonitrile (AN). As an example PET is used in this description. In the PET container industry, no adhesives are used to keep the different materials adhered to one another. Simple but weak molecular attraction is used to bond layers together.

Generally, plastic containers exhibit enough barrier properties (the means to inhibit the flow of gas or moisture molecules; e.g., oxygen, carbon dioxide, nitrogen, water through the walls of the container) thus protecting or preserving the product within the container so to meet specifications such as shelf life (how long the product will last before spoiling). In many cases, however, the provision of one or more a barrier layers in the container wall is necessary to guarantee adequate shelf life.

The provision of barrier layers is known in the prior art. One method used is to blow mold a container directly from a preform having one or more barrier layers between inner and outer walls. However, the barrier layers do not extend through the neck finish of the container and does not provide 100% barrier coverage in the container. This applies to both containers having a convention threaded finish as well as to wide mouth containers blown directly from wide mouth preforms. This is also true of prior art containers made by a blow and trim method in which the barrier layer(s) stop short of the trim line of the intermediate article blown from a preform. The lack of a substantially 100% barrier coverage limits the ability of the container to prevent product spoilage.

Making a wide mouth PET container by blow and trim or blow trim curl is known in the PET industry. Normally, in the prior art, the barrier coverage does not extend throughout the blown and trimmed container and the barrier layer normally stops short of the upper finish. It is also known that when a multiple layer PET bottle, including a barrier layer or layers in the wall thereof, is mechanically trimmed through the multiple layers, the layers begin to separate due to the weak bonds between layers. Once the layers start to separate, small applied forces continue the layer separation of the stiff walls into the finish and body area of the container and mechanical and visual defects result. The continued separation may resultfrom simply conveying, filling, capping, labeling, shipping the container or the like. A container being trimmed through the barrier layer(s) is preferred as this provides a container with substantially 100% coverage of the protective barrier throughout the container.

However, a container having substantially 100% barrier layer coverage involves the barrier layer(s) being open to the environment. Some barrier materials do not respond well to the exposure to certain agents such as moisture (e.g. water, steam). These barrier materials will perform poorly in that type of environment as the outside agents will follow the barrier layers downwardly throughout the entire container. This is especially true in filling of products where residual products may fall upon the top sealing surface. The net result is a container that does not meet the targeted specifications.

A last area that is a concern is that some barrier materials will prevent a good seal from being formed when using a film material to seal the container. This induction or heat seal is used frequently to provide additional barrier properties across the closure and/or provide tamper evidence (to show that the container was never previously opened). The film material is typically sealed across the top sealing portion of the container. The barrier material can inhibit a proper seal.

Trimming is well known in the plastic industry. There are many varieties of trimmers used to trim plastic containers. There are two general types of trimmers for highly oriented PET containers: the laser trim and the mechanical trim. The laser trimmer has an advantage in that it burns its way through the side walls of a PET container and cauterizes the edges of a multilayer PET container thus holding the multiple layers together. A weakness of this cauterized edge is that it is very narrow and the area immediately under the cut edge can begin separation if exposed to mechanical forces. The laser trimmer also has several disadvantages to it. A slow speed is needed to give precision cuts, smoke is emitted and an edge of material is built up.

Mechanical trimmers, however, cause separation of the multiple layers as the knife used exerts a force against the side wall of the container. As the knife penetrates each layer, the knife exerts a force on the next layer and separation of the layers occurs. Defects that the mechanical trimmer causes can be eliminated by the curling or shaping the edge of the container opening in accordance with the present invention. It has previously been revealed that curling a lip has significant advantages over a blow and trim edge (see Beck U.S. Pat. No. 6,062,408).

In a further example, the barrier termination is uneven and the trim line passes through portions of the barrier layer(s) and the monolayer of polymer.

OBJECT OF THE INVENTION

It is an object of the present invention to provide a method of preventing delamination or separation of multiple layers of a plastic container, with or without, barrier layers at an opening thereof, at which the multiple layers are exposed. The invention provided herein provides a method and a product that eliminates the problems of layer separation by the use of a curled or shaped container lip.

SUMMARY OF THE INVENTION

According to the invention there is provided a method of preventing delamination of multiple layers of at least one polymer container having an opening defined by the multiple layers comprising the steps of:

a) providing said container having a opening defined by a perimeter at which the multiple layers are at least partially exposed;

b) heating said perimeter until workable:

c) providing a curling device; and d) using said device to curl said perimeter sufficiently to inhibit delamination of the layers. The multiple layers may, in a preferred form, be totally exposed.

The angle of curl is preferably at least about 180° and more preferably is at least about 270° or 360°.

In a preferred form of the method, the multiple layers comprise at least inner and outer walls separated by at least one barrier layer extending throughout the container. In a further preferred form of the method, the container has been trimmed, from an intermediate blow molded article, through the at least one barrier layer to form the opening and in a more preferred form of the invention the opening has a trimmed edge forming the perimeter and said device curls the perimeter to an extent that the trimmed edge is not exposed to the environment.

In a yet further form of the method, the container comprises separate nested containers.

The invention also includes a container when made by the methods of the present invention.

BRIEF INTRODUCTION TO THE DRAWINGS

The invention will now be described, by way of example, with reference to the accompanying drawings, in which.

Figure 5:
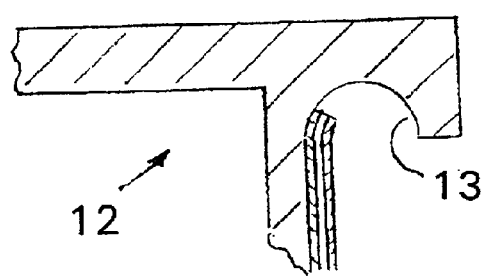

FIG. 5 diagrammatically illustrates a curling die; and

Figure 6:
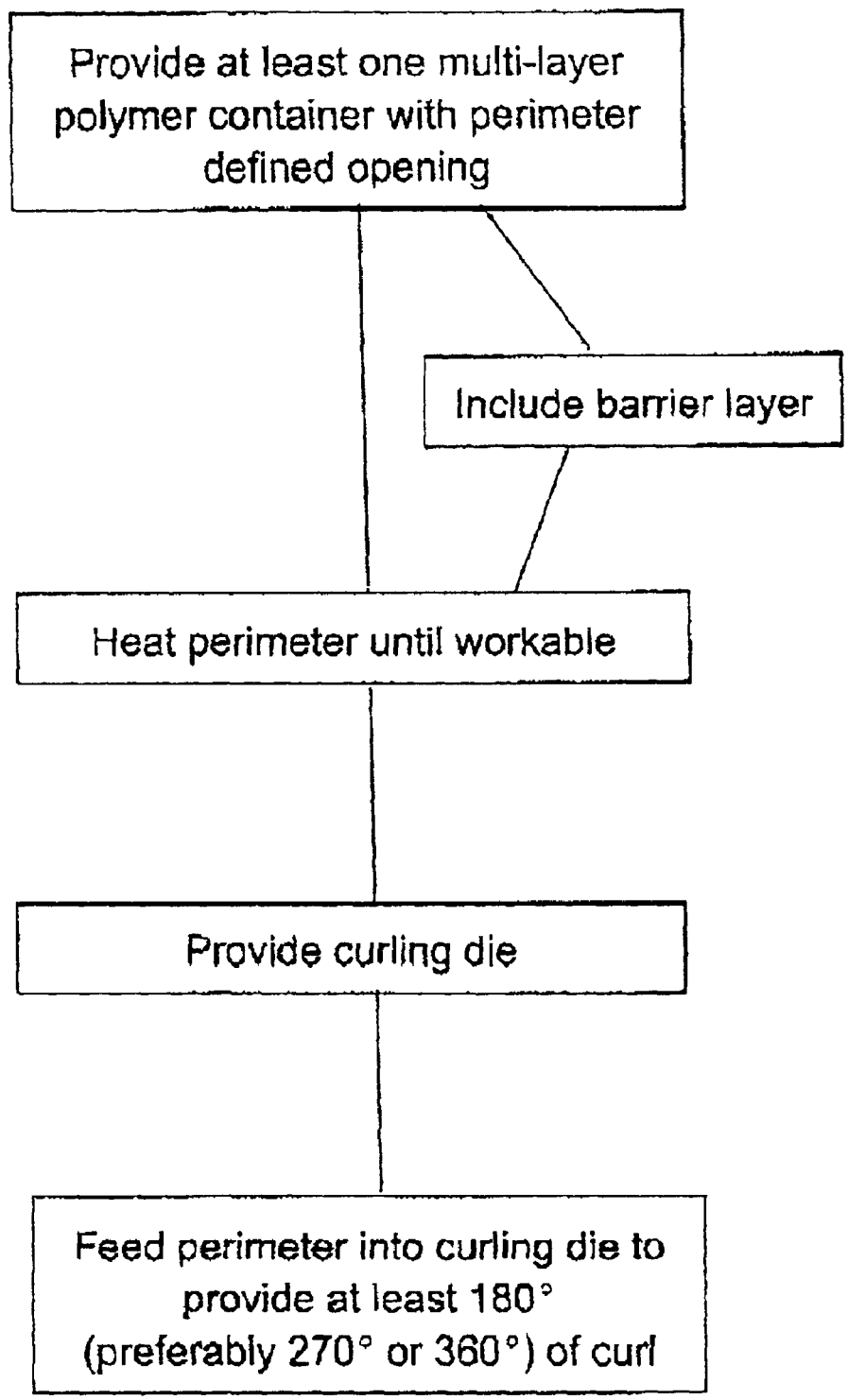

FIG. 6 illustrates the method.

DESCRIPTION OF PREFERRED EMBODIMENTS

Figure 1:
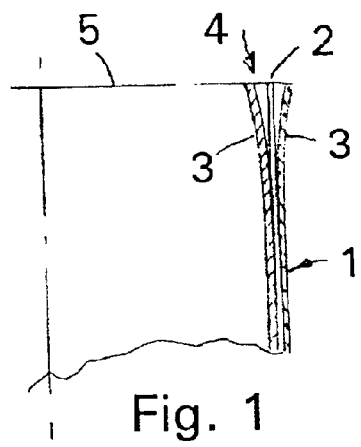
FIG. 1 is a fragmentary sectioned elevation of an open topped container showing delamination of the inner and outer plastic layers from a barrier layer.

Referring first to FIG. 1, a blow molded container 1 which has a 100 percent barrier layer 2 coverage between inner and outer bi-axially oriented plastic layers 3 of the container 1 illustrates the propensity for delamination of the barrier 2 and layers 3 when no provision for sealing the perimeter edge 4 of the opening 5 of the container is made. The container 1 may be blow molded, from a preform having at least one barrier layer extending only part of the height of the preform, to form an intermediate article which is then trimmed to at least partially and, preferably, completely expose the at least one barrier layer at the perimeter edge of the opening. Alternatively the barrier layer may extend throughout the preform and the blow molded container is formed directly from the preform.

Figure 2:
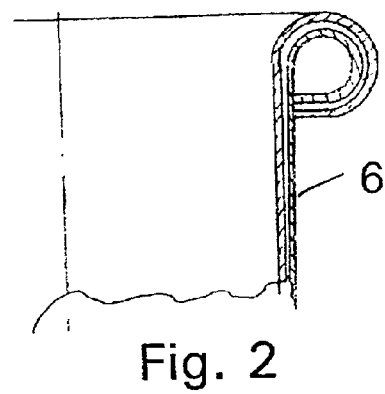
FIG. 2 shows the open topped container of FIG. 1 with the perimeter of the open top curled through 270° to prevent delamination of the layers from the barrier.

As shown in FIG. 2, the perimeter edge of the opening may be sealed to prevent delamination by curling the edge about 270° into edge contact with the wall 6 of the container so that the edge is not exposed to the environment.

Figure 3:
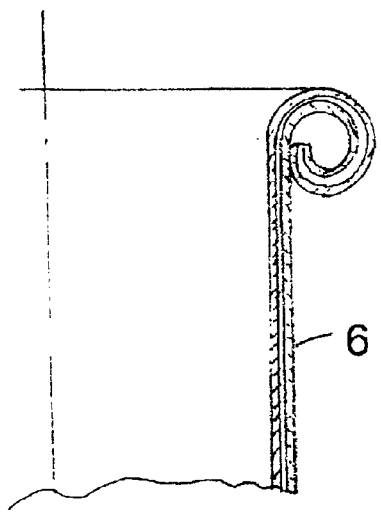
FIG. 3 is similar to FIG. 2 with a 360° curl.

Increased security against delamination may be provided by increasing the edge curl to about 360° as shown in FIG. 3. It will be appreciated the "curl", as used herein, is intended to include other shapes which will result in the edge of the opening being brought into a sealed location such as shown, for example, in FIGS. 2 and 3 and locations intermediate these.

From the above, it will be apparent that the curl itself keeps the layers intact. The resultant bi-axial oriented container thus can have 100 percent barrier coverage which is unique in itself.

Usually a waste portion of the container is mechanically trimmed to define the opening. The waste material is ground up and the material is reused. In this case, it is helpful to minimize the amount of barrier material extending into the waste area. This is accomplished by controlling the vertical height of the barrier material in a preform such that when blown into the bi-axial oriented bottle the barrier only slightly extends beyond and above the trim mark defining the container opening.

Figure 4:
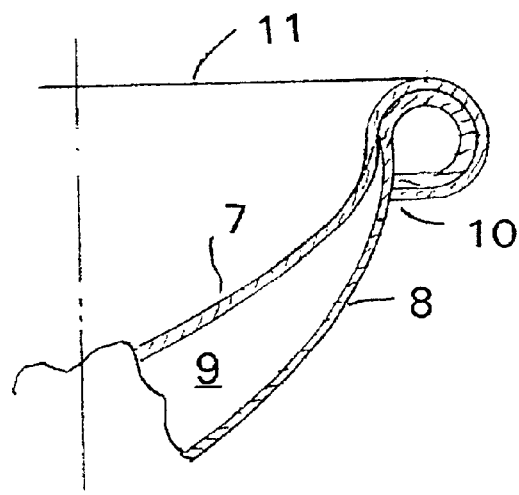
FIG. 4 is a fragmentary sectional elevation of a container having nested spaced inner and outer walls with a curled perimeter defining an opening.

FIG. 4 illustrates a variation of the invention in which inner 7 and outer 8 separately produced containers nested one in the other, for example, with a space 9 between them, are joined at the perimeter 10 of an opening 11 by a curl, as described above.

Referring to FIG. 5, the edge of the opening of the container end is then introduced to a curling unit 12. This unit heats the trimmed edges of the trimmed area. This heat can be directed from an outside source such as radiation, conduction or even convection. Frictional heat can also be used or any combination.

The heating of this area of the container causes a reduction in the orientation and shrinkage in the vertical and hoop directions. In turn, the wall thickness increases and the level of crystallinity begins to increase.

This preliminary heating softens the trimmed edges so that separation due to stiffness and lack of adhesion between layers is delayed. The container edges are then curled by curling device such as curl die 13. The softened edges then form the curl without delaminating the layers. After the curled section is cooled, the mechanical stiffness and the interlocking layers of the curl prevent separation of the edges from occurring.

The exposed edge is protected from random spills of liquid and the like.

The finish could comprise an outward roll, an inward roll or a modified flattened roll. Production of the curled finish is a function of time, temperature, pressure and tool configuration. This is accomplished once the temperature allows for workability of the edge, by feeding the edge at a predetermined rate into a curling die 13 to apply a predetermined pressure so that the flexible edge follows the form of the die and continues to loop around until the desired finish is reached. Various dies can be utilized resulting in numerous finishes.

Although curling of edges is not new, forming the curl advantageously relaxes the material's memory in the area of the curl as a result of the applied heat which anneals the material and tends to render this area amorphous and partly crystallized although not necessarily to the point where the material turns white as a result of the crystallization.

Laser trim of the edge of the opening of the container can still be used with the curl ensuring little to no separation of layers due to the additional mechanical strength of the curl.

Also the edge can be passed under a flame and the layers mechanical squeezed together. This would leave an undesirable edge. A curl would then hide the undesirable edge.

In one mode of curl would be one that extends the cut edge under itself (360° or more).

Even a curl of about 180° or less will impart sufficient resistance to delamination for certain uses.

What is claimed is:

1. A method of preventing delamination of multiple layers of at least one polymer container having an opening defined by the multiple layers, the multiple layers comprising a first layer and at least one second layer attached to the first layer, the method comprising the steps of:
   a) providing an intermediate article having an opening and trimming a waste portion of a perimeter of the intermediate article to form a polymer container having a perimeter at which the multiple layers are at least partially exposed;
   b) heating said perimeter until at least said perimeter is workable;
   c) providing a curling device; and
   d) using said device to curl said perimeter sufficiently to maintain said multiple layers intact and inhibit delamination of the multiple layers from one another.

2. The method of claim 1, wherein the multiple layers are totally exposed.

3. The method of claim 1 wherein the curl subtends at least about 180°.

4. The method of claim 1 wherein the curl subtends at least about 270°.

5. The method of claim 1 wherein the curl subtends at least about 360°.

6. The method of claim 1 wherein the multiple layers are formed by separate nested containers.

7. The method according to claim 1, wherein only the perimeter of the polymer container is heated to cause a reduction in orientation and shrinkage in both a vertical direction and a hoop direction so that a wall thickness increases and a level of crystallinity in the polymer container begins to increase.

8. The method according to claim 1, wherein the curled perimeter advantageously relaxes a memory of the material in a region of the curled perimeter, as a result of the applied heat, which anneals the plastic material and tends to partially crystallize and render the region amorphous.

9. The method according to claim 1, wherein the heating step preliminary softens the perimeter of the polymer container so that separation due to stiffness and lack of adhesion, between the multiple layers, is delayed whereby the softened perimeter forms a curled perimeter without the multiple layers delaminating from one another.

10. The method according to claim 9, further comprising the step of, following sufficient curling of the perimeter of the polymer container, allowing the curled perimeter to sufficiently cool so that a mechanical stiffness of the curled perimeter and interlocking of the multiple layers of the curled perimeter prevents separation from one another.

11. The method of claim 1 wherein the first layer and the at least one second layer comprise at least inner and outer plastic walls separated by at least one barrier layer located therebetween and extending throughout the container.

12. The method of claim 11 wherein the container has been trimmed, from an intermediate blow molded article, through the at least one barrier layer to form the opening.

13. The method of claim 12 wherein the opening has a trimmed edge forming the perimeter, and the step of using said device to curl the perimeter further comprises curling the perimeter to an extent that the trimmed edge is not exposed to the environment.

14. A method of preventing delamination of at least on plastic layer from a barrier layer defining a polymer container having an opening, the method comprising the steps of:
   a) forming, by a blow molding process, the polymer container having at least one plastic layer and a barrier layer;
   b) trimming a waste portion of a perimeter of the polymer container to define the opening of the polymer container whereby the at least one plastic layer and the barrier layer are both at least partially exposed by the trimming step and at least a portion of the perimeter of the polymer container is partially delaminated;
   b) heating the perimeter of the polymer container until the perimeter is sufficiently soften;
   c) engaging the perimeter of the polymer container with a curling device; and
   d) sufficiently curling the perimeter of the polymer container so that the sufficiently soften perimeter forms a curled perimeter without delamination of the at least one plastic layer and the barrier layer from one another and the sufficiently curled perimeter imparts sufficient resistance to delamination of the at least one plastic layer and the barrier layer from one another.

15. The method of claim 14, wherein the curl subtends at least about 180°.

16. The method according to claim 14, wherein the heating step preliminary softens the perimeter of the polymer container so that separation due to stiffness and lack of adhesion, between the barrier layer and the at least one plastic layer, is delayed whereby the softened perimeter forms a curled perimeter without the barrier layer and the at least one plastic layer delaminating from one another; and
   the curled perimeter advantageously relaxes a memory of the material in a region of the curled perimeter, as a result of the applied heat, which anneals the plastic material and tends to partially crystallize and render the region amorphous.

17. The method according to claim 14, further comprising the step of, following sufficient curling of the perimeter of the polymer container, allowing the curled perimeter to sufficiently cool so that a mechanical stiffness of the curled perimeter and interlocking of the barrier layer with the at least one plastic layer of the curled perimeter prevents separation from one another.

18. The method of claim 14, wherein the barrier layer is sandwiched between an inner plastic layer and an outer plastic layer.

19. The method according to claim 18, wherein only the perimeter of the polymer container is heated to cause a reduction in orientation and shrinkage in both a vertical direction and a hoop direction so that a wall thickness increases and a level of crystallinity in the polymer container begins to increase.

20. A method of preventing delamination of at least one plastic layer from a barrier layer defining a polymer container having an opening, the method comprising the steps of:
   a) forming, by a blow molding process, an intermediate article having at least one plastic layer and a barrier layer;
   b) trimming a waste portion of a perimeter of the intermediate article to form the polymer container and define the opening of the polymer container whereby the at least one plastic layer and the barrier layer are both at least partial exposed by the trimming step and at least a portion of the perimeter of the polymer container is partially delaminated;
   c) heating the perimeter of the polymer container until the perimeter is sufficiently soften so that separation between the barrier layer and the at least one plastic layer, due to stiffness and lack of adhesion, is delayed;

d) engaging the perimeter of the polymer container with a curling device; and e) sufficiently curling the perimeter of the polymer container about an angle of at least about 180° so that the sufficiently soften perimeter forms a curled perimeter without delamination of the at least one plastic layer and the barrier layer from one another and the sufficiently curled perimeter imparts sufficient resistance to delamination of the at least one plastic layer and the barrier layer from one another.

* * * * *